United States Patent
König et al.

[15] 3,691,922
[45] Sept. 19, 1972

[54] A METHOD AND APPARATUS OF CONTRAST-DEPENDENT SHARP FOCUSSING

[72] Inventors: Gottfried König; Peter Schornstadt, both of Dresden, Germany

[73] Assignee: VEB Pentacon Dresden Kamera-und Kinowerke, Dresden, Germany

[22] Filed: Jan. 4, 1971

[21] Appl. No.: 103,671

[52] U.S. Cl. ................................... 95/44 R, 355/55
[51] Int. Cl. ............................................. G03b 3/00
[58] Field of Search ...95/10, 42, 44 R, 44 C; 355/55, 355/59, 61

[56] References Cited

UNITED STATES PATENTS

| 3,504,610 | 4/1970 | Dönitz | 95/44 R |
| 3,336,851 | 8/1967 | Warshawsky | 95/44 R |
| 2,922,351 | 1/1960 | Hering | 95/45 |
| 3,274,913 | 9/1966 | Biedermann et al. | 95/44 C |
| 3,511,155 | 5/1970 | Yamada | 95/44 R |
| 3,495,913 | 2/1970 | Hoagland | 95/44 R |

Primary Examiner—John M. Horan
Assistant Examiner—Richard A. Wintercorn
Attorney—Young & Thompson

[57] ABSTRACT

A method of performing contrast dependent sharp focussing of an optical system. Light is direct via an object lens through an image field diaphragm and rotatable optical wedge. A measurement area is defined which is scanned by the optical wedge in combination with a photoelectric receiver behind the measurement area. The photoelectric receiver provides a variable frequency output signal in dependence upon the brightness/darkness distribution within the measurement area, which signal is processed by an electrical circuit to provide a frequency dependent signal which is used to automatically or semi-automatically adjust the position of the object lens to provide sharp focussing.

17 Claims, 10 Drawing Figures

METHOD AND APPARATUS OF CONTRAST-DEPENDENT SHARP FOCUSSING

BACKGROUND TO INVENTION

The invention relates to a method for the contrast-dependent sharp focussing of optical systems in photographic taking cameras, in which by means of a lens which is to be focussed and of an image field diaphragm, the brightness distribution generated in a measurement plane is photoelectrically measured by means of a photo-electric receiver, i.e., a photo-conductive cell, the signals delivered by the photoelectric receiver being utilized through an electric amplifier circuit for the operation of a lens-adjusting device.

The methods of direct sharpness measurement which avoid the circuitous procedure of range measurement are known. Here apart from methods which are based upon the scanning of the contour sharpness of an image of the object to be focussed — time succession— different variants exist of the simultaneous detection of the entire image content of the image section selected as measurement area. Mention should be made here especially of the method of reproduction of the object to be focussed on a photoelectric receiver with non-linear association between electrical output signal and illumination intensity and the method of the evaluation of two-part images, produced in the image field of the adjusting lens by means of prism arrangement, for coincidence.

A further known method is based upon the fact that a Foucault knife-edge uniformly screens off the light if the edge stands exactly at the focal point of a lens. If it lies before or behind the focal point, the two halves of the light beam will be shadowed with different intensities, so that photoelectric scanning of the light distribution in the light direction behind the image plane leads to an objective focussing criterion.

According to another known method the scanning of the light distribution in the resultant exit pupil of a system consisting of the adjusting lens and at least one additional member is proposed. The criterion for the detection of measured value is a uniform light distribution on sharp focussing. The measured value detection takes place either dynamically by means of rotating blade-type diaphragm or statically by means of a bridge circuit of two photoelectric receivers.

All the mentioned methods possess the following disadvantages as regards their use in cameras:

Inadequate sensitivity especially in the case of low object contrasts; as a result of inertia-caused limit sensitivity in photoconductive cells their use is very limited; the sharpness-independent variables of the object, such especially as the variation of the integral object brightness and the variation of the object contrast, can be compensated only under very special conditions and only with loss of energy; finally the stated methods possess a relatively great sensitivity to jolting.

It is the purpose of the present invention to avoid the indicated disadvantages with minimum possible expenditure both of optical and of electro-mechanical means.

The problem of the invention is a semi-automatically or fully automatically working sharpness indicator for the contrast-dependent sharp focussing of optical systems with an objective electronically evaluatable measurement criterion, preferably for use in photographic cameras, where the shadowing effect of an image field diaphragm is utilized as sharpness criterion. The problem further consists in that as regards optimum setting criterion an intensity variation allocated to the degree of sharpness is achieved on the photoelectric-receiver.

SUMMARY OF THE INVENTION

According to the present invention there is provided a method of performing contrast-dependent sharp focussing of an optical system including the steps of receiving light from an object through an object lens, an image field diaphragm and through movable optical means all located in succession in the light path through said optical system, rotating the optical means to effect scanning of a measurement area which for any desired object distance is formed by a common nucleus of all projections of the exit pupil of an image field definition, as a projection center, upon a plane perpendicular to the optical axis and localized in the light path at a suitable distance behind the image field diaphragm, detecting the brightness/darkness distribution within the measurement area by means of a photoelectric-receiver arranged to produce a variable frequency output signal therefrom to feed electrical circuit means connected to the photoelectric receiver, processing said output signal in said electrical circuit means to obtain a frequency dependent signal therefrom and applying said frequency dependent signal to means by which in accordance with said signal, the object lens is moved to a position at which said object is brought sharply into focus at the image field diaphragm.

In order to increase the sensitivity to de-focussing, especially for vertical object edges, the image field diaphragm may be provided with linear limitations and/or a zone of reduced light transmissivity is achieved by an additional central covering within the image field diaphragm.

The advantages obtained from the method are:
Considerable increase of sensitivity independently of the azimuth position of the object edges;
Reduction of the influence of jolting;
Relatively effective compensation of the integral object luminous intensity as a result of the possible selection of a decouplable higher measurement frequency;
Reduction of the effect of the photoconductive cell inertia by means of selective feed-back, which regulates out the quasistatic proportion during build-up;
The elimination of additional optical reproduction means and elimination of light ray-dividing means which would be necessary for compensation receivers.

As a result of further features of the invention the method provides the placing of a conical light conductor before the photoelectric-receiver, whereby the intensity of the illumination on the photoelectric-receiver is increased and thus the setting time thereof is reduced. Furthermore the voltage drop over the photoelectric-receiver is influenced by a working resistor formed as controllable resistor.

Finally the signal generated in the photoelectric-receiver is kept constant for all frequencies which do not correspond to the single scanning frequency, do not correspond to a frequency band consisting of any desired number of harmonics or lie below the single scanning frequency.

The invention also provides that for the manual sharp focussing of the object lens the ideal-actual comparison is carried out visually by the seeking of the extreme value of an electric indication means, for example by reflection of a pointer deflection of an electric measuring instrument into the viewfinder light path. It is within the scope of the invention that an RC-double-T-barrier filter is used in a feed-back branch of the amplifier circuit.

In accordance with a further feature of the invention there is provided in a photographic camera having an optical viewing system in which contrast dependent sharp focussing takes place and having an adjustable object lens mounted in the camera housing, the provision of a system including an image field diaphragm provided in the light path in said camera through said object lens, movable optical means rotatably mounted in the light path behind said diaphragm, a photoelectric-receiver mounted to receive light which passes through said optical means onto a measurement area which for any desired object distance is formed by a common nucleus of all projections of the exit pupil of the object lens by means of all image points possible within an image field definition, as a projection center, upon plane perpendicular to the optical axis and localized at a suitable distance in the light path behind the image field diaphragm, frequency dependent electrical circuit means adapted to respond to a variable frequency signal emitted by the photoelectric receiver and an adjustable device coupled with said object lens and connected with the output of the electrical circuit means for adjusting the position of said lens, whereby light from an object to be sharply focussed is received through said object lens, said diaphragm and said movable optical means into said measurement area, whereupon the movable optical means scans said area in association with the photoelectric-receiver to provide according to the brightness/darkness distribution a variable frequency signal from said photo-electric receiver, said electrical circuit means being adapted to provide a frequency dependent output signal in accordance with which the adjustable device is adjusted to move the object lens until the object is sharply focussed.

In a preferred embodiment, the camera may consist of a mirror-reflex camera, in a manner in which a reflex mirror arranged in the viewfinder light path possesses at least one partially mirror-coated zone and an image field conjugated with the image plane and limited by means of image field diaphragm is generated in the interior of the camera by means of a auxiliary mirror arranged behind the partially mirror-coated zone, while a further deflection mirror is arranged between the image field diaphragm and the photo-receiver arranged therebehind.

The movable optical means comprises a motor-driven optical rotating wedge which is arranged between image field diaphragm and measurement plane.

Further features of the invention are illustrated and described both as regards principle and by means of an example of utilization.

Figure 1:
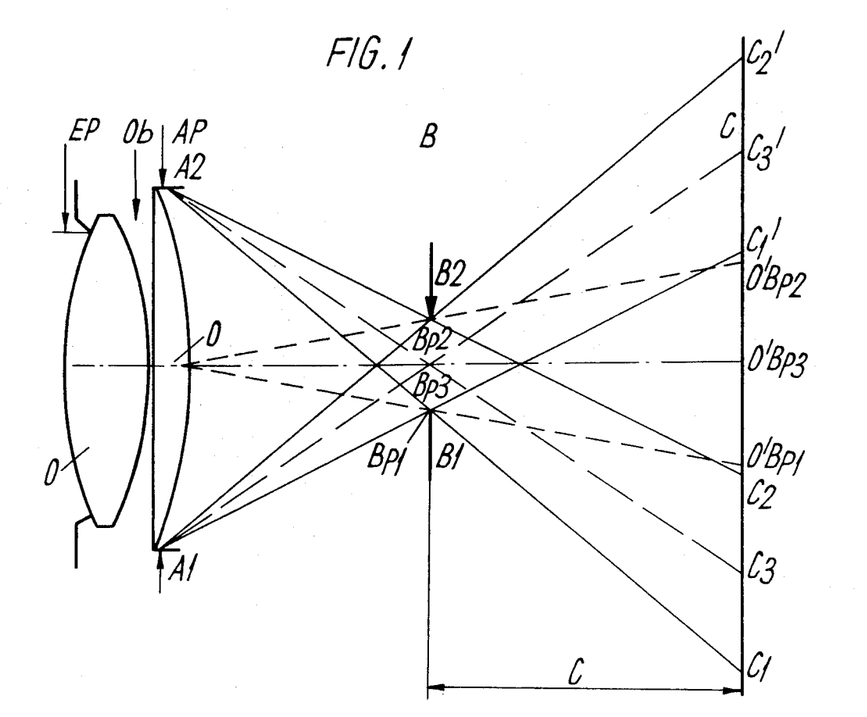
FIGS. 1 and 4 show an image-side ray cone.

DESCRIPTION OF PREFERRED EMBODIMENT:

FIG. 1 shows the possible ray space in a simple reproducing optical system, for example in a photographic camera, with a lens 0 to be sharply focussed with its aperture diaphragm 0b and its exit pupil AP or A1A2 and an image field diaphragm B with the diameter B1B2. C is an interception plane on which the measured value detection takes place by means of a photoelectric receiver to be described in greater detail later. Image-side ray cones as represented are determined for an axial image point B$p$3 and two image points B$p$1 and B$p$2 lying on the image field limitation B1B2. It is here a matter of image points lying in the plane of the drawing, in meridional section.

The light distribution in the interception plane C can be interpreted as super position of the projections of the exit pupil area, common to all image points, of the adjusting lens O through all image points as projection center upon the interception plane C.

Figure 2:
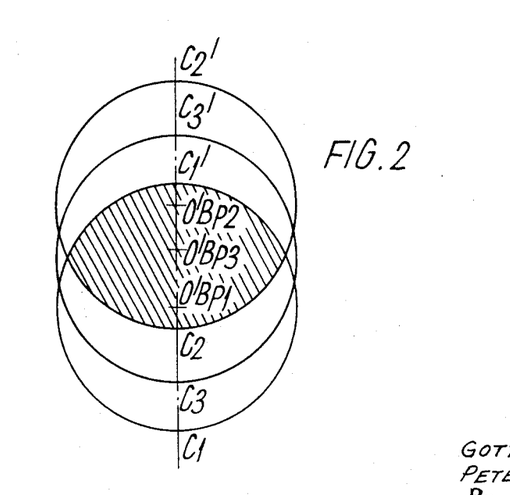
FIGS. 2 and 3 show the light distribution in the interception plane in the case of the superimposition of several image points.

As may be seen from FIG. 2, the projections of the represented three image points B$p$1, B$p$2 and B$p$3 are circles offset in relation to one another which possess a common hatched nucleus area of the extent GL'C2. The hatched nucleus area according to FIG. 2 shows the relationships in the interception plane C considered perpendicularly of the optical axis.

Figure 3:
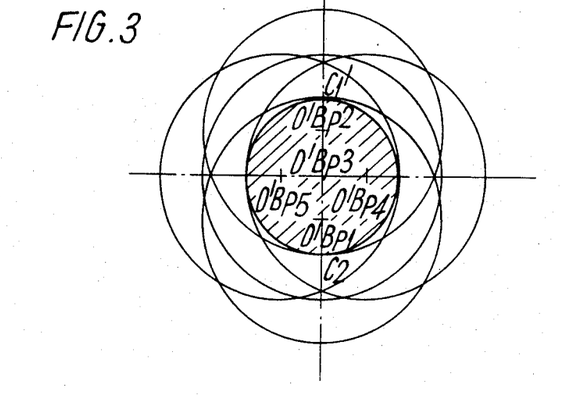

FIG. 3 shows the relationships in the interception plane C in the focussed position, likewise considered perpendicularly of the optical axis, merely with the addition of two further radial-symmetric image points B$p$4 and B$p$5. If one forms the envelope of the inner area common to all projected circles, a circular area with the diameter C1'C2 is obtained. This nucleus area, represented hatched, which must be the aperture diaphragm of the optical system for all possible image points within the image field diaphragm B, in the focused position, that is to say all image points B$p$1 to B$p$5 lie in the image field plane B which with uniform illumination of the exit pupil of the adjusting lens, possesses a light distribution uniform for all image points localized within the image field diaphragm, which is independent of their light intensity and area distribution in the image field diaphragm.

Figure 4:
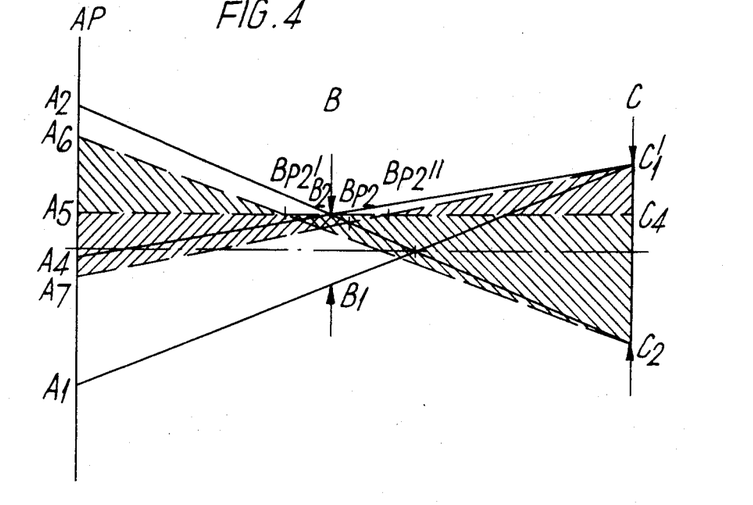
Figure 5A:
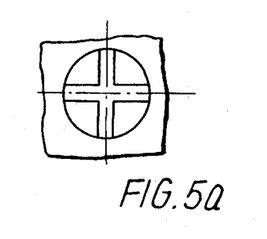
FIGS. 5a and 5b show the image field diaphragms with different limitation lines.
Figure 5B:
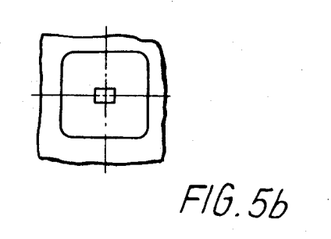

In the de-focussed position an irregular light distribution occurs within the nucleus area C1'C2 as a result of shadowing by the edges of the image field diaphragm B. FIG. 4 illustrates this situation with reference to the non-sharp positions B$p2'$ and B$p2''$ allocated to the image point B$p2$, on displacement of the adjusting lens O, the object range being great in comparison with the focal length. In the sharply focussed position a light cone A2A4B2 illuminates the entire measurement area with the diameter C1'C2 in the interception plane C completely uniformly. On the other hand in the intra-focal position B$p2'$ a cross-section of the light cone A5A6B$p2$ is obtained which in the interception plane C only the area between C2C4 is illuminated. In the case of extra-focal de-focussing in the position B$p2''$ a light cone A7A5B$p2$ is obtained which in the interception plane C only the area C1C4 is illuminated. In order to achieve a still greater increase of sensitivity as regards de-focussing the following ways are proposed:

According to recognition of the fact that the highest sensitivity to de-focussing is present for image points which are in contact with the image field diaphragm B, the important point is to increase the probability that as many object edges or image edges as possible come into contact with the image field diaphragm. According to examples of embodiment according to FIGS. 5$a$ and 5$b$ sensitivity increase is effected by linear limitations — the probability for the presence of linear object edges in the case of any desired objects is maximum — and/or a central covering or reduced light transmissivity.

Figure 6:
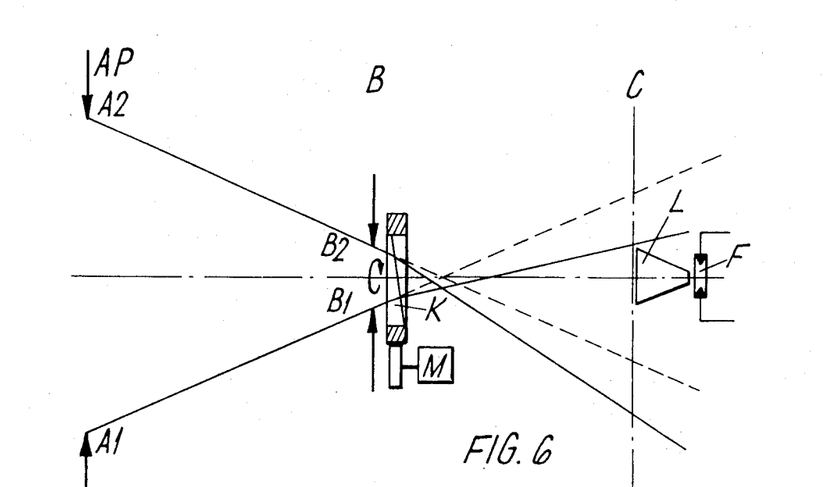
FIG. 6 shows the arrangement of light-refracting and light-gathering optical components in the image-side ray cone.

A further increase of the sensitivity to defocussing is obtained by increasing the illumination intensity upon a photoconductive cell (FIG. 6) by a light-collecting optical means, for example a conical light-conductor rod L, which increases the intensity of illumination in proportion to its cross-sectional area reduction. In this connection FIG. 6 shows an arrangement in which the light conductor rod L is positioned between interception plane C and a photoconductive cell F. Due to this measure it is possible substantially to reduce the lower limit illumination intensity which is conditioned not by amplification but by inertia when photoconductive cells are used. An increase of the intensity of illumination as is known reduces the adjustment time of photoconductive cells.

The photoelectric measured value detection in the interception plane C can take place, for example, in a manner in which a photoelectric-receiver travels around the peripheral regions of the illuminated area to be measured, in the interception plane C, in such a way that the photoelectric-receiver itself rotates about the optical axis, the pick-up of the electric signal taking place through slip contacts. According to an example of embodiment in accordance with FIG. 6 the photoelectric measured value detection takes place by means of a fixed arrangement, formed in the optical axis directly behind the interception plane C, of the photoelectric-receiver F and the light-conductive rod L in combination with a rotatable wedge K driven by means of motor M and arranged between the image field diaphragm B and the interception plane C.

Figure 7:
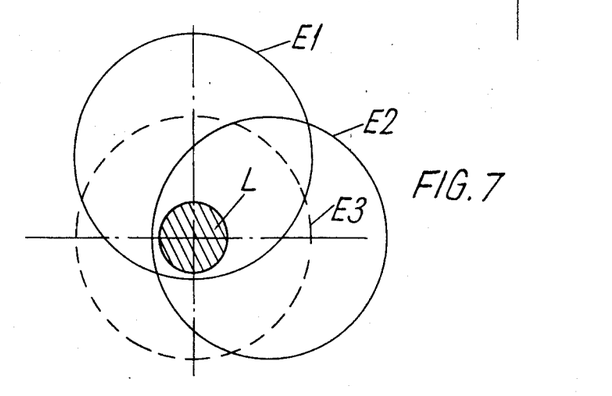
FIG. 7 shows the optical action of a rotating wedge for two positions rotated through 90°.

FIG. 7 shows the effect of the rotatable wedge K for two positions E1 and E2 when the wedge is rotated through 90°. It can be seen here that the light entry area of the light conductive cone L lies eccentrically in the area to be measured. E3 shows the position of the measurement area shown in chain lines without the rotatable wedge. The wedge angle of the rotatable wedge K and its distance from the light entry area of the arrangement of light conductive cone L plus photoconductive cell F must be so adapted to one another that the peripheral regions of the measurement area in the interception plane C appear as a light spot rotating on the light entry area of the light conductor L.

The depicted selection of the wedge angle of the rotatable wedge K ensures that the photoconductive cell F receives only light deriving from the measurement area C. So that the focus position is independent of the image content or the position of individual image details independently of the selection of the lens O and independently of the indicatrix of directly or indirectly lighting objects, the following principle-determined pre-requisites are necessary for the contrast-dependent sharp focussing of optical systems in photographic cameras.

As already stated, the measurement area in the interception plane C must be the aperture diaphragm of the optical system, consisting of adjusting lens O, image field diaphragm B and measurement area C1'C2, for all object points possible within the image angle given by the size of the image field diaphragm outline. The possible size of the measurement area depends upon the relative aperture of the adjusting lens O, its range of adjustment, the maximum lateral extent of the image field diaphram B and the distance $c$ between measurement plane C and image field diaphragm plane B according to FIGS. 1, 4 and 6. Where interchangeable lenses are used an adjustable optical system with a minimum relative aperture is adopted as a basis. The focussing is to be effected with open diaphragm. Displacement of the adjusting lens O must not cause any shadowings not conditioned by effect. For this reason the measurement area in the interception plane C is to be dimensioned for the most unfavorable case, namely the shortest possible object distance.

The exit pupil AP of the adjusting lens with a focal length $f$ is to be interpreted as a uniformly illuminating area. This requires a degree of uniformity of the illumination of the exit pupil of about 10 percent and a minimum object range $e$ of $e > 10f$, in order to guarantee a radiation characteristic of lambert form of the object to be taken, in the given solid angle. The intensity of illuminating object points is then to be regarded as constant within this solid angle given by the diameter of the entry pupil EP of the adjusting lens O and its distance from the object. The main prerequisite for optimum accuracy of measurement for the automatic sharp focussing is the presence of an object contrast or of a brightness distribution within the image field diaphragm B. The further processing of the signal occurring at the photoelectric cell or photoconductive cell F can take place in such a manner that either semi-automatic or fully automatic influencing of the adjusting lens is possible in the direction of sharp focussing.

In the case of a semi-automatic sharp focussing of the lens the adjustment thereof takes place manually on the basis of a visually effected ideal-actual comparison on an electric indicating means, for example a pointer instrument. The movement of the lens to be adjusted takes place until the extreme value of the electric output signal appears on this pointer instrument. Thus the human eye is relieved as a sharpness indicator, but must still take over the substantially facilitated operation of judgement of the extreme value of the pointer travel.

It is different in the case of fully automatic sharp focussing of an optical system in a photographic camera. An ideal-actual comparison carried out by means of an extreme value finder effects the motor displacement of the lens, so that the human eye is completely relieved. In the operation of a camera the eye than has only the task, by means of the viewfinder, of bringing the selected object to be sharply focussed into conformity with the image field determined in the camera for the requirements of sharp focussing This image field is determined in its shape, size and position by the external outlining of the image field diaphragm as already described, and is characterized in the viewfinder, the viewfinder image field being conjugated with the image field diaphragm.

Figure 8:
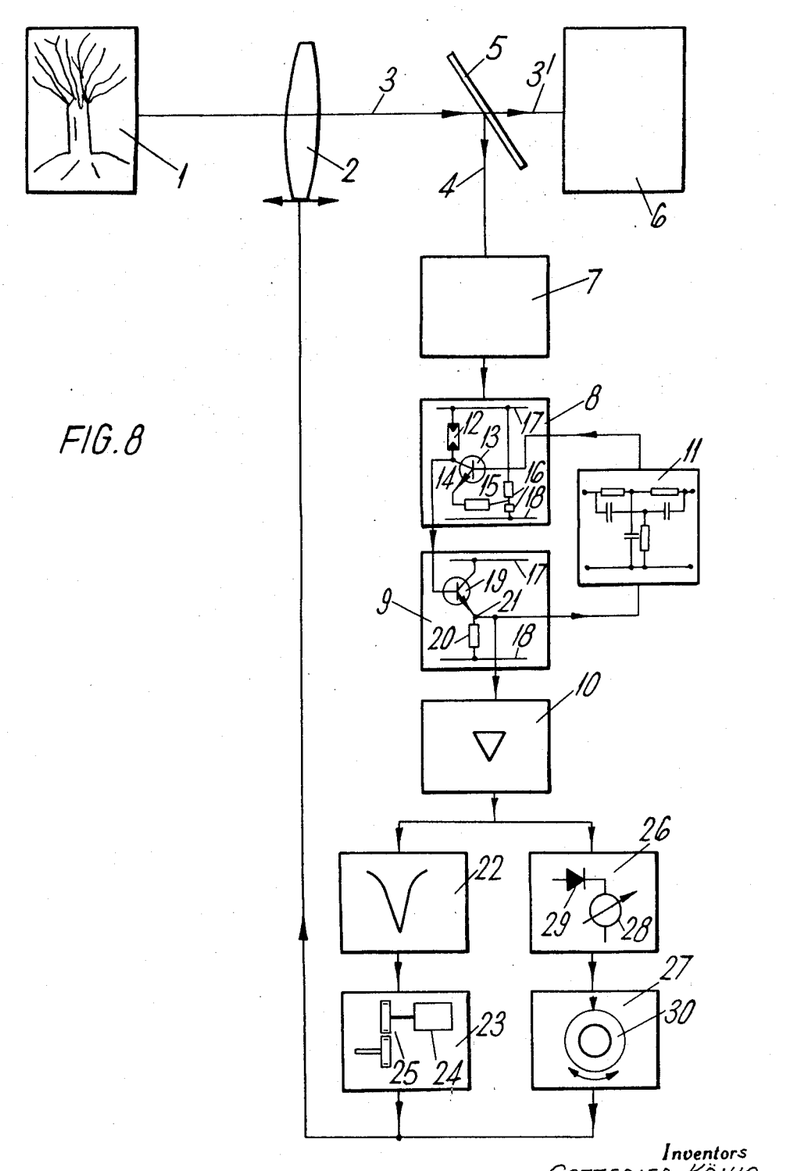
FIG. 8 shows the electrical-mechanical block circuit diagram for carrying out the method.

In an example of an optical focussing arrangement represented as a partially block schematic circuit diagram in FIG. 8, the circuit blocks of an electronic circuit shown there have the following essential tasks: electric amplification for the purpose of controlling either an indicator instrument or an extreme value finder at optimum sensitivity, maximum possible exclusion of interference values, such as the variation of the interval image brightness and jolting which occurs due to rapid change of position of the optical system in relation to the image section to be focussed sharply. Here it should also be noted that an alternating signal occurring according to the light distribution in the measurement area contains at the output of the photoelectric-receiver the rotational speed of the optical rotating wedge as its basic frequency. On the other hand the interference signal spectrum caused as a result of variations of the integral image brightness or jolting lies below the measurement frequency given by the wedge rotational speed, in the case of suitable selection of this rotational speed.

According to the example of embodiment shown in FIG. 8, the construction groups shown there have the following significance:

Light rays coming from an object 1 are reproduced by means of an adjustable lens 2 in a plane 6 or a conjugated plane associated therewith (not shown further). A partially transparently mirror-coated reflex mirror 5 situated in ray path 3 reflects a part of the ray path 3 so that parts thereof arrive as ray path 4 by way of circuit block 7 upon a photoelectric receiver or photoconductive cell 12 situated in the circuit block 8. The circuit block 7 comprises the parts described in detail in FIG. 6, which consist of the image field diaphragm B1B2 in a plane B conjugated with the image plane 6, the optical roating wedge K, the servomotor M and a light conductive zone L situated behind the measurement plane C.

In general the circuit blocks 8, 9, 10 and 11 display the principle of assembly of the electric measured value processing circuitry. The circuit 8 as a first amplifier stage consists of: photoconductive cell 12, transistor 13 operable to be effective as a controllable resistor, output 14, resistor 15 and voltage divider 16. In this case conductor 17 has positive voltage and conductor 18 negative voltage. The circuit 9, a further amplifier stage, comprises a transistor 19 and a load resistor 20 with an output 21 which is connected both with the input of amplifier circuit 10 and also with the input of the transistor 13 through the filter circuit 11, which is constituted by a double —T—RC— barrier filter. The resistor 15 determines the degree of feed-back of the circuits 8 and 9, and the voltage divider 16 determines the direct-current voltage across the photoconductive cell 12.

The circuit blocks 22 and 23 which are intended for the fully automatic sharp focussing consists of an extreme value finder 22, the effect of which is known per se and which therefore is not described in greater detail, and a servomotor 24, required for the sharp focussing with gearing 25 for the adjustment of the lens 2.

The circuit blocks 26 and 27, which are provided with a measuring instrument 28, a rectifier 29 and a manually operable adjusting knob 30, serve for semi-automatic adjustment.

The manner of operation of the example of embodiment as represented in FIG. 8 is as follows:

As already mentioned, the output 21 of the amplifier circuit 9 is connected through the filter circuit 11 with the input of the transistor 13 in the amplifier circuit 8. Since the double-T-RC-barrier filter is tuned to the fundamental oscillation of the measurement frequency given by the wedge rotational speed, a selective feed-back is obtained which greatly attenuates all frequencies of the signal spectrum present on the output 14 in the circuit 8 which lie to either side of the fundamental oscillation of the measurement frequency. This signifies that the voltage from the output 14 is kept most extensively constant for all frequencies lying to either side of the measurement frequency. Thus the interferences caused by variations of the integral image brightness as a result of variation of the object brightness, on change of subject and on jolting — are compensated. Moreover the quasistationary build-up action caused by the inertial of the photoconductive cell, especially at low object luminous intensities, is regulated out.

Due to these measures the compensation receiver provided in the system of a differential circuit, to be charged with the integral image brightness, as is usual according to the prior art, is eliminated. A compensation photoelectric-receiver, which was replaced according to the invention by the electrically influenceable transistor 13, also has the disadvantage that on the one hand a ray divider with corresponding space requirement and energy loss is needed, but on the other hand uniformity requirements must be made of both photoelectric-receivers, which in practice can be realized only very incompletely.

The double—T—RC—barrier filter 11 could also be formed by a low-pass filter or by the combination of a low-pass and a high-pass filter. In this case the limit frequency of the low-pass filter in both cases would lie below the measurement frequency and that of the high-pass filter below a specific number of harmonics of the measurement frequency. In comparison with the latter two variants the double —T—RC—barrier filter has the advantage that inequalities in the illumination of the exit pupil of the adjusting lens, which appear as an interference signal despite sharp focussing are filtered out better. The demands of the constancy of the wedge rotational speed are not so high. Finally, at the output of the amplifier 10 an alternating signal appears which passes through a minimum or the value approximately zero in the case of sharp focussing In the case of fully automatic sharp focussing the output signal from the amplifier 10 is fed in a manner known per se to an extreme value finder 22, not described in greater detail. This then in turn by means of the circuit 23 corresponding to the lens motor 24 and gearing 25 controls the adjustable lens 2, which is automatically halted on reaching the point of sharpness.

After rectification by means of rectifier 29 in the circuit 26, in the case of semi-automatic sharp focussing that is to say in the case of manual rotation of the setting knob 30 in the block 27, whereby the lens 2 is adjusted and at the point of sharpness there is obtained a visually judgeable minimum of a pointer deflection on the measuring instrument 28.

Figure 9:
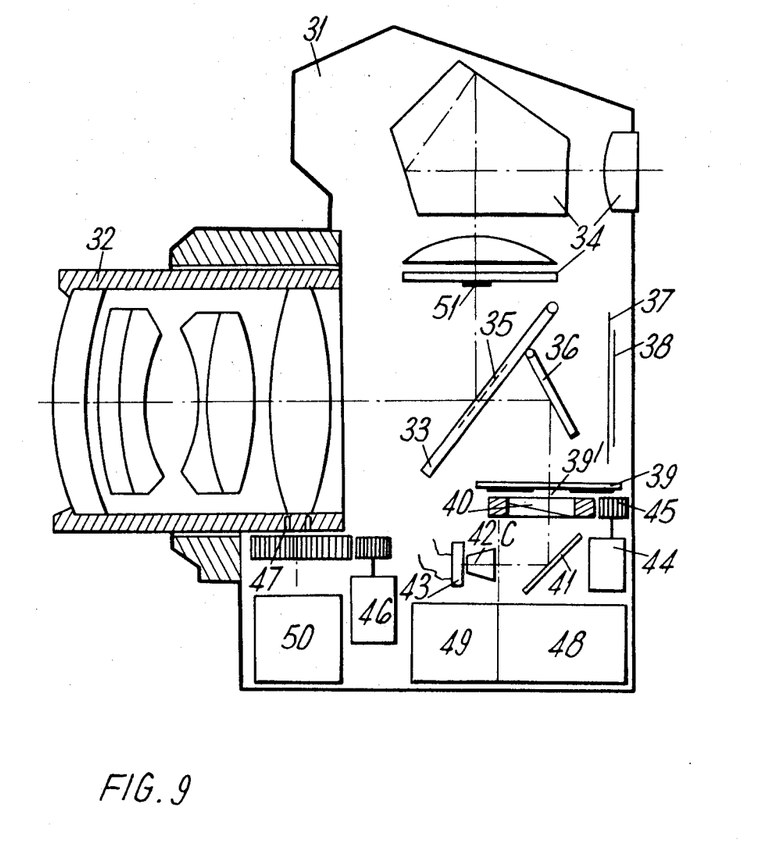
FIG. 9 shows a photographic camera with automatic sharp focussing device.

FIG. 9 contains as example of embodiment all the principal elements of a mirror reflex camera with fully automatic sharp focussing in diagrammatic form.

An object lens 32 is adjustably mounted in a camera housing 31. The light coming from a subject passes through the lens 32 on to a reflex mirror 33, in order thence to be reflected partially into a viewfinder device 34. On the reflex mirror 33 there is a partially transparently mirror-coated zone 35 which permits a part of the light coming from the subject to arrive upon an auxiliary mirror 36. Behind the reflex mirror 33 in known manner there is a diagrammatically represented image plane shutter 37 with a film 38 arranged therebehind. Beneath the auxiliary mirror 36 in the ray path there are provided an image field diaphragm 39, a rotating wedge 40 and a further deflecting mirror 41 inclined in relation to the ray path. The light rays reflected by the mirror 41 pass by way of a light-conducting cone 42 arranged in the measurement plane C upon a photoelectric-receiver 43 situated therebehind. The rotating wedge 40 is driven by a motor 44 through a toothed wheel gearing 45. The adjustment of the object lens 32 is effected by an electric motor 46 and an eccentric gearing 47 connected by gearing with the motor. At the bottom of the camera housing 31 there are accommodated for example a voltage source 48, the various electrical circuits such as these described with reference to FIG. 8 and here shown as a single block 49 and an extreme value finder 50.

Automatic sharp focussing is effected with the reflex mirror 33 hinged down. Apart from possible image viewing in the viewfinder system 34, an image of the object to be sharply focussed is projected by means of the partially transparently mirror-coated zone 35 of the reflex mirror 33 to the auxiliary mirror 36 arranged therebehind and into the image field diaphragm 39. By means of the image field diaphragm 39, the rotating wedge 40 driven by the motor 44 through the gearing 45, the deflecting mirror 41 and the light conductive cone 42 situated in the ray path under photoconductive cell 43, the light distribution in the plane C allocated to the light entry area of the light conductive cone 42 is scanned and the electrical signals produced in the photoconductive cell 43 are amplified by means of the amplifier circuit 49 and fed to the extreme-value finder 50. The latter halts the lens motor 46 at the point of sharpness, which motor operates the object lens 32 through the eccentric gearing 45.

The manner of operation of the automatic sharp focussing according to the example of embodiment in FIG. 9 is as follows:

Firstly, after selection of the subject has taken place the image field 51 conjugated with the clear internal cross-section 39' of the image field diaphragm 39 is directed to the viewfinder 34 in which the object to be sharply focussed is characterized. Then the shutter release knob (not shown) is operated as far as a first pressure point. The entire electrical circuit of sharp focussing is thereby connected to the voltage source 48, whereby inter alia the lens motor 46 starts up. The object lens 32, which is actuated from any desired initial position and reversed at the end of the region by means of the eccentric gearing 47, runs until the extreme-value finder 50 halts the lens motor 46 at the sharpness point. Thereafter the shutter release can be further operated, whereby the entire electrical circuit of sharp focussing is switched off again through a contact (not illustrated further) and the object ray path is cleared by pivoting the reflex mirror 33 and the auxiliary mirror 36 out of the ray path.

The image field diaphragm 39 is here formed, with maintenance of minimum possible thickness and easy fitting, expediently from a possibly dereflective glass plate with concentric limitations applied by vaporization.

In the case of semi-automatic sharp focussing the motor 46 including the eccentric gearing 47 and the extreme value finder 50 are eliminated. In place of these components an indicator instrument (not shown further) is used, the pointer of which is to be reflected into the viewfinder ray path for the purpose of observation.

It is within the scope of the invention that the method for the contrast-dependent sharp focussing of optical systems relates not only to photographic cameras, but it is entirely conceivable for the method also to be usable for other sharpness-measuring optical appliances, such as optical examination means, for example focal length measuring appliances, enlargement appliances, microfilm picture-taking and reproduction appliances, etc..

What we claim is:

1. A method of performing contrast-dependent sharp focussing of an optical system including the steps of receiving light from an object through an object lens, an image field diaphragm and through movable optical means all located in succession in the light path through said optical system, rotating the optical means to effect scanning of a measurement area which for any desired object distance is formed by a common nucleus of all projections of the exit pupil of an image field definition, as a projection center, upon a plane perpendicular to the optical axis and localized in the light path at a suitable distance behind the image field diaphragm, detecting the brightness/darkness distribution within the measurement area by means of a photoelectric-receiver arranged to produce a variable frequency output signal therefrom to electrical circuit means connected to the photoelectric receiver, processing said output signal in said electrical circuit means to obtain a frequency dependent signal therefrom and applying said frequency dependent signal to means by which in accordance with said signal, the object lens is moved to a position at which said object is brought sharply into focus at the image field diaphragm.

2. A method as claimed in claim 1, including applying said frequency dependent signal to an extreme value finder which controls the operation of a motor for moving the object lens.

3. A method as claimed in claim 1, including applying said frequency dependent signal to a rectifier and meter arrangement and manually adjusting a knob which controls the movement of the object lens until a minimum deflection is obtained on said meter.

4. A method as claimed in claim 1, including increasing the intensity of illumination upon the photo-receiver and reducing the adjusting time of the photo-receiver by applying the light incident upon the measurement area to a conical light conductor before the photo-receiver.

5. A method as claimed in claim 1, wherein the voltage drop over the photo-conductive cell is influenced by means of a resistor operable as a controllable resistor.

6. A method as claimed in claim 1, wherein the signal generated in the photo-receiver is kept constant for all frequencies which do not correspond to a frequency band consisting of any desired number of harmonics, or lie below the single scanning frequency.

7. In a photographic camera having an optical viewing system in which contrast dependent sharp focussing takes place and having an adjustable lens mounted in the camera housing, the provision of a system including an image field diaphragm provided in the light path in said camera through said object lens, movable optical means rotatably mounted in the light path behind said diaphragm, a photoelectric-receiver mounted to receive light which passes through said optical means onto a measuremnet area which for any desired object distance is formed by a common nucleus of all projections of the exit pupil of the object lens by means of all image points possible within an image field definition, as a projection center, upon plane perpendicular to the optical axis and localized at a suitable distance in the light path behind the image field diaphragm, frequency dependent electrical circuit means adapted to respond to a variable frequency signal emitted by the photoelectric receiver and an adjustable device coupled with said object lens and connected with the output of the electrical circuit means for adjusting the position of said lens, whereby light from an object to be sharply focussed is received through said object lens, said diaphragm and said movable optical means into said measurement area, whereupon the movable optical means scans said area in association with the photoelectric-receiver to provide according to the brightness/darkness distribution a variable frequency signal form said photoelectric receiver, said electrical circuit means being adapted to provide a frequency dependent output signal in accordance with which the adjustable device is adjusted to move the object lens until the object is sharply focussed.

8. A camera as claimed in claim 7, wherein an aperture through which light passes through the image field diaphragm is provided with linear sides for vertically defining object edges.

9. A camera as claimed in claim 8, wherein the image field diaphragm is provided with a center covering to achieve a zone of reduced light transmissivity.

10. A camera as claimed in claim 7, including a conical light conductor positioned infront of the photoelectric-receiver in the light path through the camera whereby the intensity of illumination upon the photoelectric-receiver is increased and the adjustment time thereof decreased.

11. A camera as claimed in claim 7, wherein the electrical circuit means includes two amplifier stages having a feedback line therebetween including a filter arrangement.

12. A camera as claimed in claim 11, wherein the filter arrangement comprises an RC—double—T—barrier filter.

13. A camera as claimed in claim 7, including a viewfinding light ray path, a reflex mirror in the light path for reflecting light towards the viewfinder, an auxiliary mirror positioned behind the reflex mirror in the light path for receiving light which passes through a partially mirror coated zone on the reflex mirror and a further deflecting mirror positioned between the movable optical means and the photoelectric-receiver for reflecting light from the auxiliary mirror through the image field diaphragm and the movable optical means to the photoelectric-receiver.

14. A camera as claimed in claim 13, wherein the movable optical means comprises an optical wedge driven by a motor.

15. A camera as claimed in claim 7, including an extreme value finder connected to the output of said electrical circuit means and a motor for moving said object lens in dependence upon the voltage applied to it from the extreme value finder.

16. A camera as claimed in claim 7, including a rectifier and meter arrangement, and a knob for manually moving said object lens in association with the movement of the pointer of said meter.

17. A camera as claimed in claim 7, wherein the image field diaphragm consists of a glass plate with concentric boundaries deposited thereon by evaporation.

* * * * *